United States Patent [19]

Sakamoto

[11] 4,309,828
[45] Jan. 12, 1982

[54] ATTACHMENT FOR A MAGNETIC NEEDLE ASSEMBLY FOR VEHICLES

[76] Inventor: Shoji Sakamoto, 38-16, Hikawadai, 4-chome, Nerima-ku, Tokyo, Japan

[21] Appl. No.: 72,637

[22] Filed: Sep. 6, 1979

[30] Foreign Application Priority Data

Nov. 2, 1978 [JP] Japan .......................... 53/151340[U]

[51] Int. Cl.³ .............................................. G01C 17/04
[52] U.S. Cl. ..................................... 33/355 R; 33/333;
33/347; 116/284; 224/273; 224/312
[58] Field of Search ...................... 33/333, 347, 355 R,
33/356, 357, 358; 116/284, 289; 224/311, 312, 273, 282

[56] References Cited

U.S. PATENT DOCUMENTS

| 1,317,086 | 9/1919 | McConnell | 33/333 |
| 1,485,102 | 2/1924 | Wells | 224/282 X |
| 1,556,557 | 10/1925 | Paemelaere | 33/355 UX |
| 1,570,459 | 1/1926 | Champion | 33/355 X |
| 2,056,715 | 10/1936 | Dinsmore | 33/357 X |
| 2,389,664 | 11/1945 | Giannini | 33/364 X |
| 2,422,960 | 6/1947 | Giannini | 33/364 X |
| 2,525,848 | 10/1950 | Wolfe | 33/355 X |
| 2,628,008 | 2/1953 | Innis | 224/312 X |
| 2,939,585 | 6/1960 | Burgin | 224/273 X |
| 3,276,137 | 10/1966 | Lore | 33/355 X |

FOREIGN PATENT DOCUMENTS 2162694  6/1973  Fed. Rep. of Germany ...... 224/312

Primary Examiner—William D. Martin, Jr.
Attorney, Agent, or Firm—Holman & Stern

[57] ABSTRACT

A device for attaching a compass assembly to a vehicle body comprising a support rod provided with a ball member on its end, said rod being disposed vertically on the upper surface of the housing of said magnetic needle assembly.

5 Claims, 4 Drawing Figures

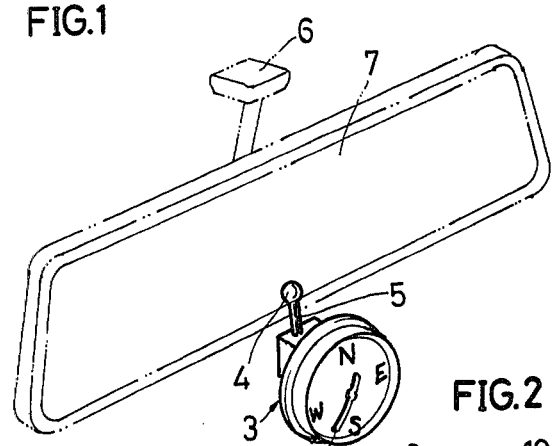
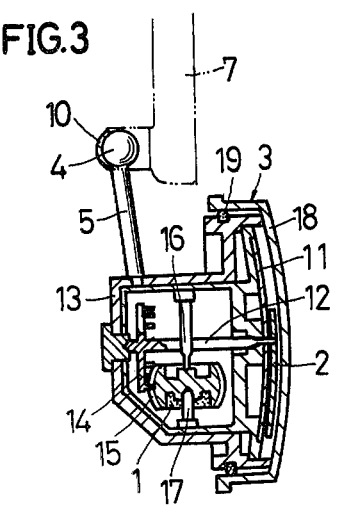
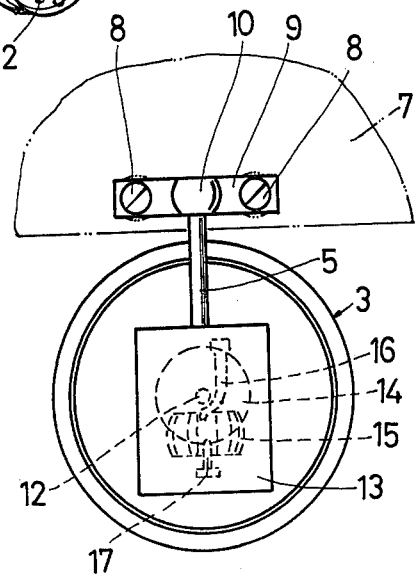
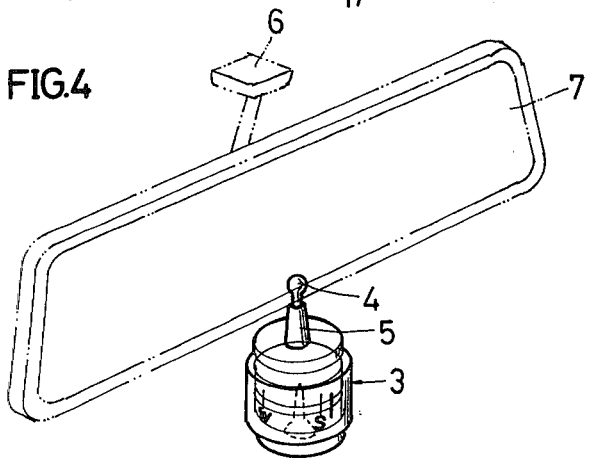

ATTACHMENT FOR A MAGNETIC NEEDLE ASSEMBLY FOR VEHICLES

BRIEF DESCRIPTION OF THE INVENTION

This invention relates to an attachment for a magnetic needle or compass assembly, comprising a support rod provided on its end with a ball member and disposed vertically on the upper surface of the housing of the compass assembly which contains a magnet as well as a needle workable under the influence of the magnet, the ball member being rotatably attached through a fixing member to a rear-view mirror or to a mirror detachably secured to the rear-view mirror which is attached to the inside of the vehicle by means of a fixing piece.

Conventional compasses for vehicles have drawbacks in that they do not work correctly because of the fact that they are attached to a metal part near the driver's seat and are therefore affected by the metal.

The object of the present invention is to provide an attachment for a magnetic needle assembly which is free from the aforementioned drawbacks and in which the compass needle can work correctly, the attachment being capable of hanging a magnetic assembly from the room mirror which is disposed in a location relatively less metallic, and the attachment making it possible also to adjust the compass assembly so as to be positioned vertically because of its being attached to the room mirror and having the effect that the north-pole of the compass, which is subject to changes according to the point of location, can be corrected with ease. The present invention provides further advantages in that it can be observed easily because of its being positioned near the room mirror which is observed very often while driving the vehicle.

The invention will now be described in more detail with reference to the accompanying drawings showing one preferred embodiment of the present invention, wherein:

FIG. 1 is a perspective view of a first embodiment;
FIG. 2 is a rear plan view;
FIG. 3 is a longitudinal side sectional view; and
FIG. 4 is a perspective view of a second embodiment.

DETAILED DESCRIPTION OF THE INVENTION

This invention relates to an attachment for a compass assembly for vehicles in which the magnet can work correctly without being influenced by any metal part.

An embodiment of the attachment according to this invention will now be described with reference to the drawings.

In the embodiment shown in FIGS. 1 to 3, the reference numeral 1 indicates a magnet, 3 is a compass assembly provided with a needle or indicating pointer 2 to be actuated by the magnet 1; 5 indicates a support rod provided on its end with a ball member 4 and vertically disposed on the upper surface of the housing 13 of the assembly.

A fixing member 9 is secured with screws 8 to the rear surface of a rear-view mirror 7 which is mounted on the inside of the vehicle by means of a fixing member 6 and the assembly 3 is mounted on the inside of the vehicle by fitting the ball member 4 within the spherical recess 10 of the fixing member 9.

Reference numeral 11 shows an indicator plate mounted such that an axle 12 passes through the plate and the needle 2, mounted on the projecting end of the axle, turns on the surface of said plate.

The second shaft or axle 12, which is secured to a crown gear 14, is rotatably attached to the housing 13 of the assembly body 3 and a spherical gear 15 provided with the magnet 1 is disposed to engage the gear 14.

The spherical gear 15 supported both from above and below by needle shafts 16 and 17 turns under the influence of the magnet 1 and transmits its movement to the needle 2. 18 is a transparent cover member of the indicator plate 11 and it is secured with an O-ring 19 fitted in the assembly body 3.

The embodiment shown in FIG. 4 indicates a magnetic needle assembly formed cylindrically in accordance with the present invention, the construction for mounting the assembly being similar to that of the previous one.

I claim:

1. A compass assembly for use in vehicles, comprising a housing having an opening and containing:
   a first shaft means attached to said housing,
   a spherical gear, coaxially and rotatably supported by said first shaft means,
   a magnet secured within said spherical gear, said magnet and said spherical gear forming a one-piece unit,
   an indicator plate having an aperture therein, said plate being secured to an external portion of said housing,
   a second shaft means one end of which is rotatably mounted in said housing and the other end of which projects through the opening in said housing and through the aperture in said indicator plate, said second shaft means disposed at approximately a right angle to the axis of said first shaft means,
   a second gear coaxially secured to said second shaft means and engaging said spherical gear,
   an indicating pointer affixed to the projecting end of said second shaft means;
   a transparent cover member secured to said housing to permit viewing of said indicator plate and said indicating pointer.

2. The compass assembly of claim 1, wherein said first shaft means is coplanar with said second shaft means.

3. The compass assembly of claim 1, wherein said one-piece unit has two axial bearing supports and said first shaft means comprises a first shaft member and a second shaft member each having an end which is received by the two bearing supports, said first and second shaft members supporting said magnet from above and below, respectively.

4. The compass assembly of claim 1, wherein the second gear is a crown gear.

5. The compass assembly of claim 1, wherein an attaching means is affixed to said housing comprising a rod provided at the free end with a spherical member whereby said spherical member is received within a bracket secured to said vehicle and having an aperture commensurate in shape to said spherical member.

* * * * *